Patented Sept. 22, 1931

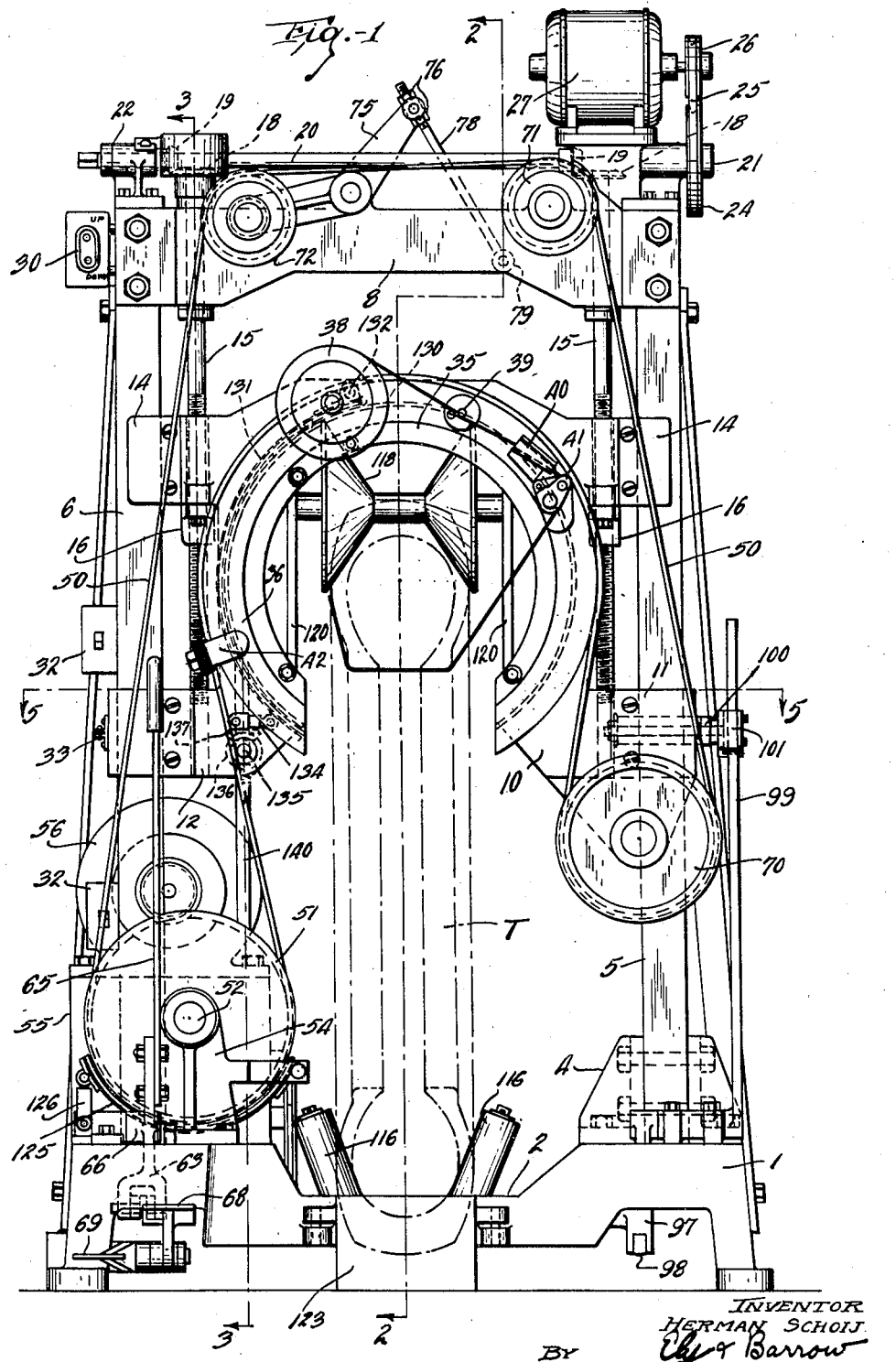

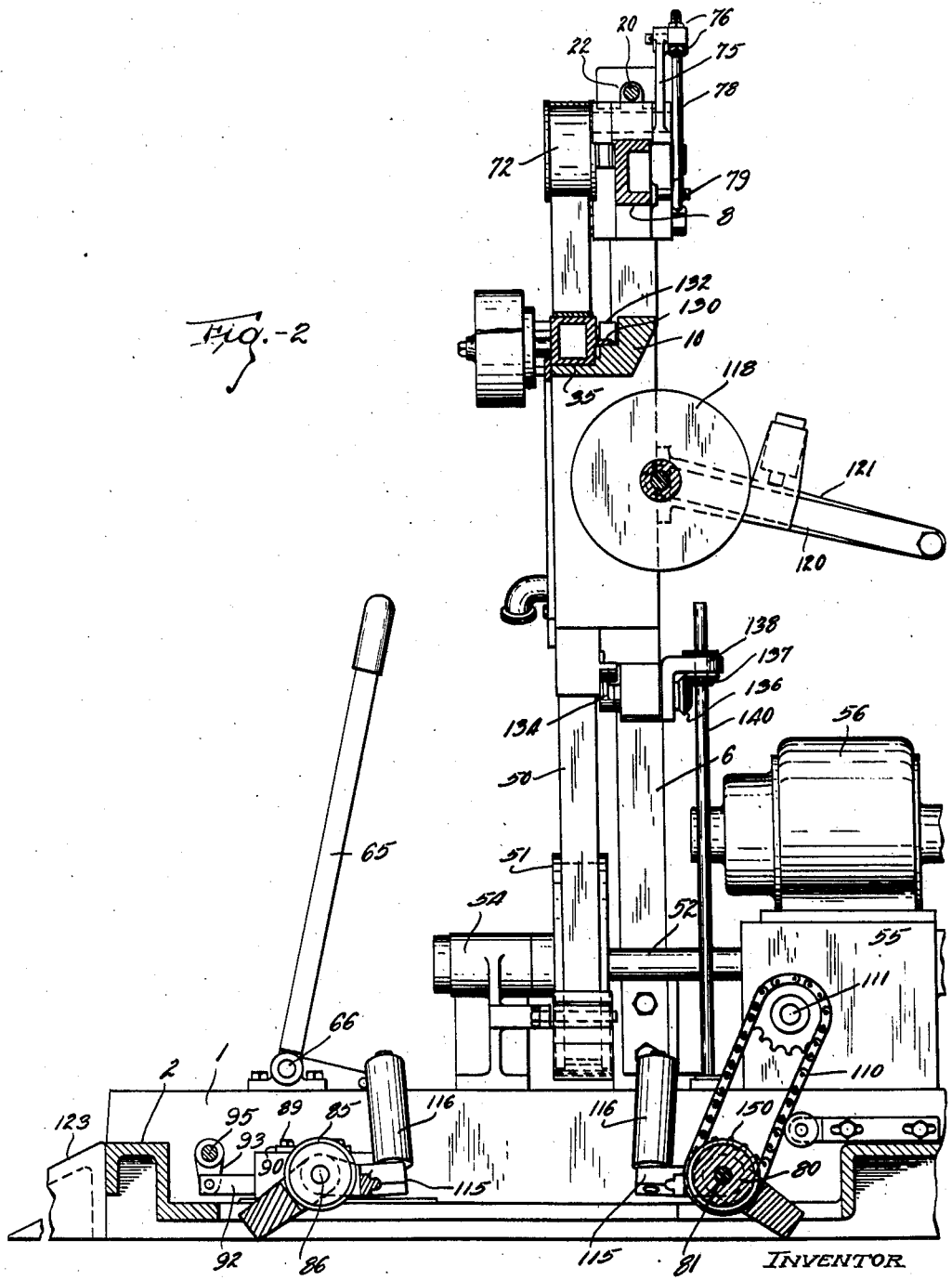

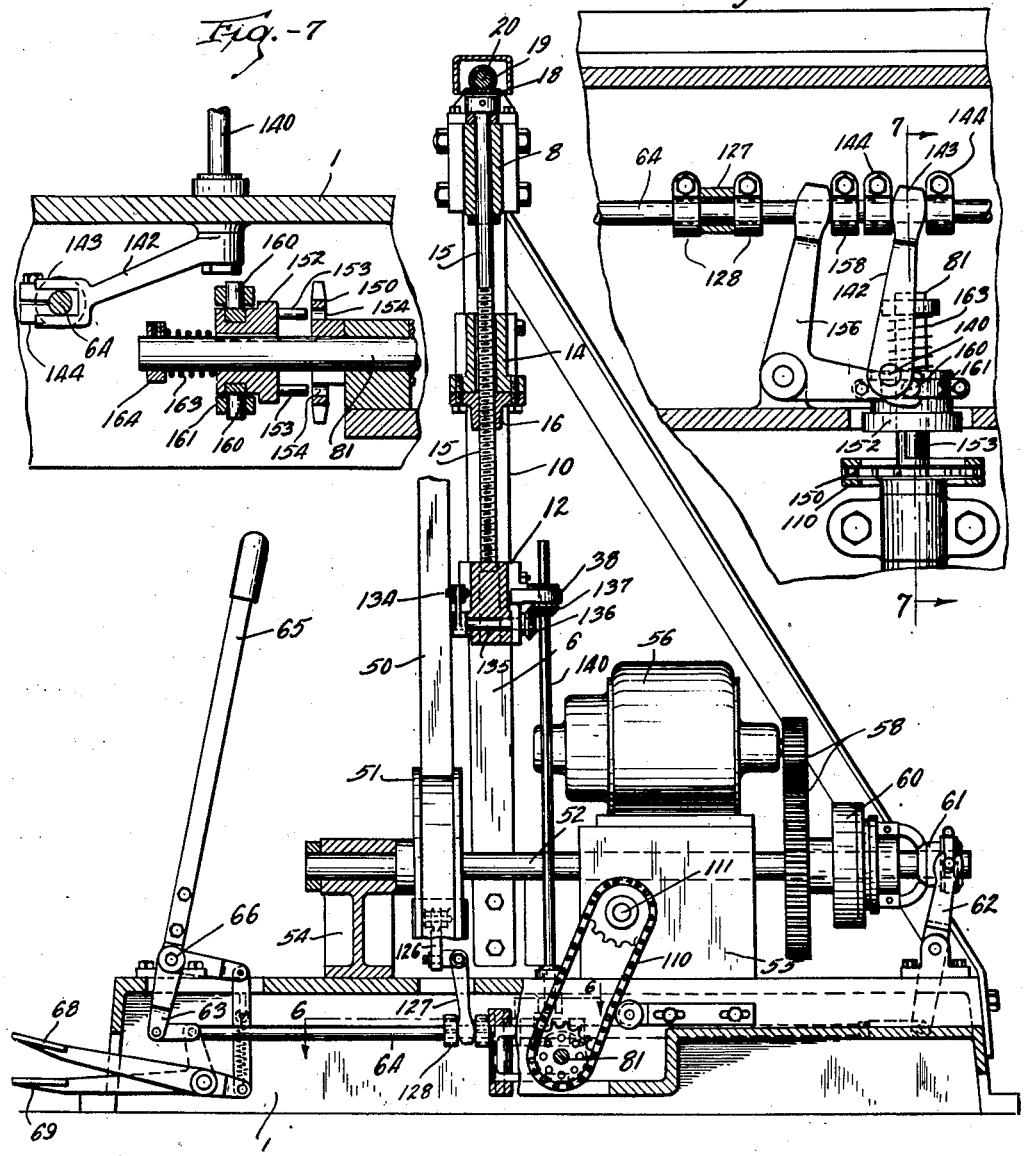

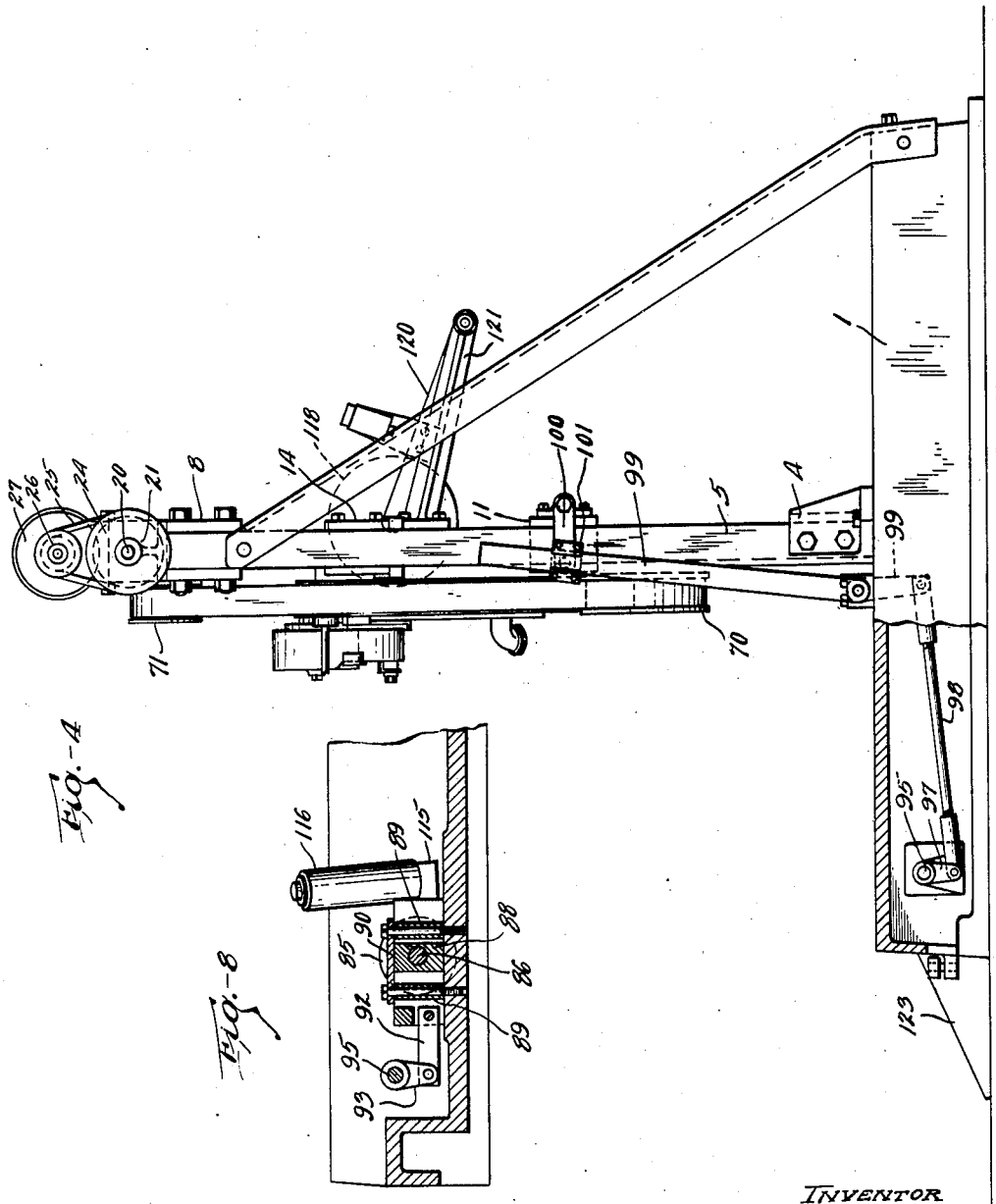

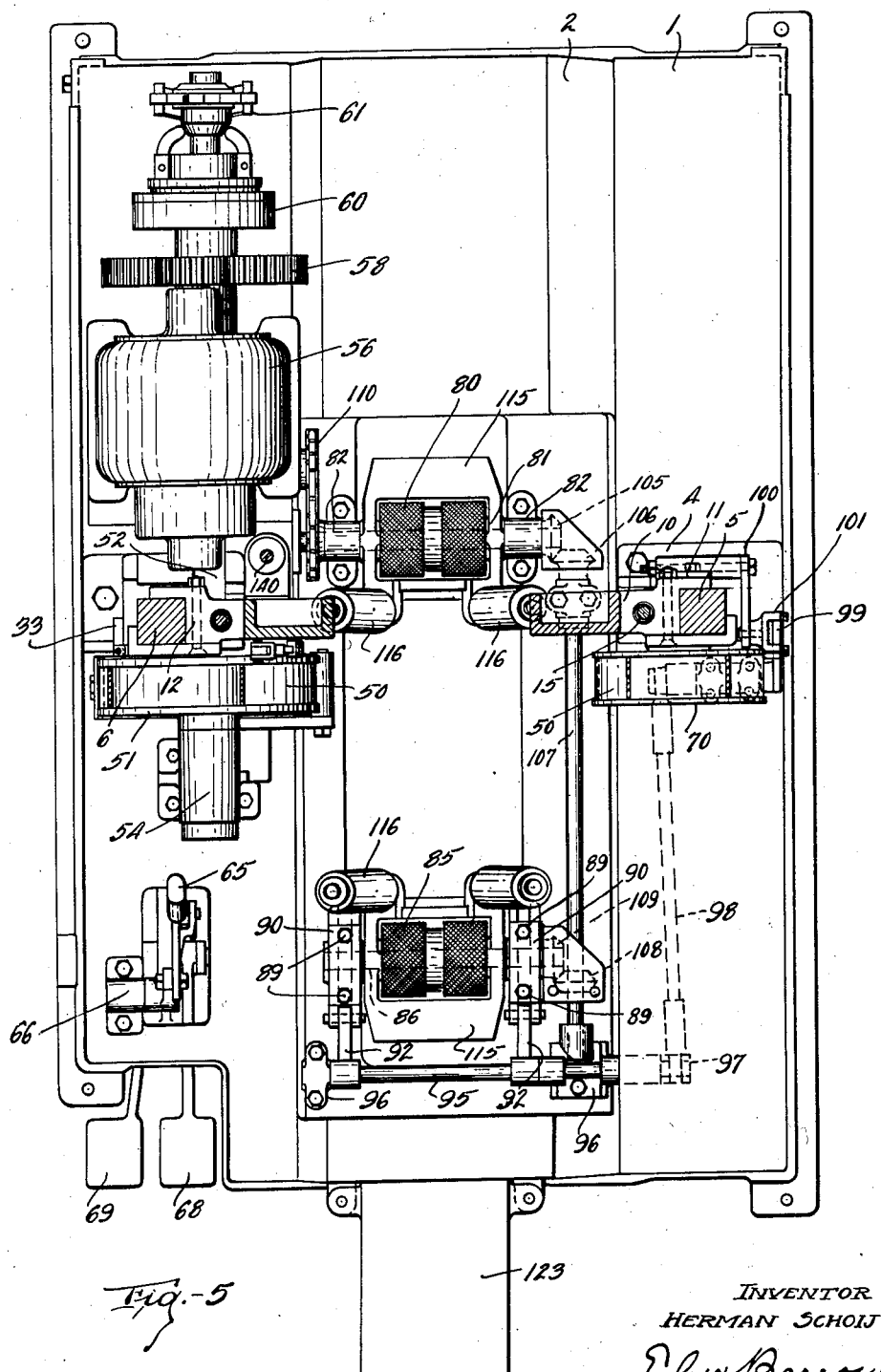

1,824,374

UNITED STATES PATENT OFFICE

HERMAN SCHOIJ, OF CHICAGO, ILLINOIS

WRAPPING MACHINE

Application filed March 23, 1929. Serial No. 349,296.

The present invention relates to the wrapping of annular bodies, such, for example, as tire casings for which this machine is particularly designed.

The object of the invention is to improve upon machines intended particularly for the wrapping of large ring-shaped articles, such as truck tires, the design of the machine obviating the lifting of these heavy tires as is necessary in machines at present in use. The machine is designed to wrap the tires at the top, so that the shuttle and its associated elements are located at the top of the machine, the supporting drums for the tire being but slightly elevated from the floor.

An object of the invention is to provide power driven means for adjusting the height of the shuttle to accommodate different sizes of tires, so that the operator can quickly adjust the machine for every size of tire which it is designed to wrap. A further object of the invention is to provide means for automatically maintaining an invariable length of path for the belt at any vertical adjustment of the shuttle, this being accomplished by mounting one of the pulleys on the shuttle frame. Simultaneously with the adjustment of the shuttle vertically of the machine, one of the driving drums for supporting and driving the tire, is automatically moved toward and from the center of the machine so as to shift the position of the tire in conformity with its size, whereby the lead of the paper from the shuttle will remain the same. This is what is known in the art as a "differential adjustment," but it is accomplished in a novel manner, suitable particularly for the present type of machine. Provision is also made in the machine in connection with the differential adjustment of a device by means of which the degree of automatic differential adjustment may be varied to suit conditions.

The machine also has for its object the coordination of various elements of the wrapping device, thereby obtaining faster and more accurate operation.

These and other objects are accomplished in the organized machine shown and described herein, it being understood that the inventions are not necessarily limited to exact conformity with the details of the machine, but may be varied within the scope of the invention.

In the drawings;
Figure 1 is a front view of the improved tire wrapping machine;
Figure 2 is a vertical section on the line 2—2 of Figure 1;
Figure 3 is a vertical section on the line 3—3 of Figure 1;
Figure 4 is a side elevation;
Figure 5 is a horizontal section on the line 5—5 of Figure 1;
Figure 6 is an enlarged horizontal section on line 6—6 of Figure 3;
Figure 7 is a section on the line 7—7 of Figure 6; and
Figure 8 is an enlarged detail of the shiftable tire supporting drum.

The machine is supported upon a base or bed plate 1, the central portion of which is provided with a trough 2 in which the tire is located while being wrapped and through which it passes into and out of the machine. At about the center line of the bed plate and on one side of the trough is secured a standard 4 in which is mounted the lower end of a vertical guideway 5. A similar vertical guideway 6 is provided on the opposite side of the machine, the upper ends of the guideways being connected and braced by the horizontal bridge or cross head 8, which is located at the top of the machine a sufficient distance to accommodate the shuttle at its highest point of adjustment.

The shuttle is rotated by means of an endless belt 50 which surrounds the upper portion of the shuttle and is driven by a flanged pulley 51, located on a shaft 52 at the base of the machine. The forward end of the shaft is mounted in the bearing 54, attached to the base of the machine and the rear end in a housing 55, upon which is mounted the motor 56, for driving the machine. This motor is connected by reduction gearing 58 to the clutch 60. The shaft 52 and motor are connected or disconnected by the clutch, which is operated by the clutch operating cone 61, movable along the shaft by the pivoted lever 62. The lever 62 is shifted by means of a longitudinally movable control shaft 64, which is located in the base of the machine, being pivoted at one end to the lever 62 and at the other to an arm 63, which is pivoted at 66 on the base of the machine. The arm 63 has an operating hand lever extension 65. It is also adapted to be moved by the foot treadles 68 and 69, which are connected as shown in Figure 3.

The belt 50 after leaving the flanged pulley 51 and the shuttle, passes over an idler pulley 70 journalled on the carriage 10 and movable with it. The belt then passes over the two smaller idler pulleys 71 and 72 on the bridge. The last named pulley may be mounted and operated as a belt tightener, being supported on a pivoted arm 75, the end of which is adjustable so as to move the pulley 72, by means of the nuts 76 on the threaded rod 78, the latter being pivoted to the cross head at 79.

By supporting the pulley 70 directly on the shuttle carriage 10, the length of the path traversed by the belt is maintained fixed or invariable at any height of the shuttle.

Mounted between the guideways 5 and 6 is a shuttle carriage 10, the lower right hand corner of which, as viewed in Figure 1, is provided with an arm 11 engaging the guideway 5 and the lower left hand corner of which is provided with a similar arm 12 engaging the guideway 6. The upper corners of the shuttle carriage are provided with brackets 14, which engage the guideways on either side of the carriage.

The carriage is supported in any vertical position of adjustment by two vertical screw threaded shafts 15 which are mounted in the bridge 8 and which engage nuts 16, attached to the under sides of the brackets 14. The screw shafts are received in passages in the brackets and arms 11 and 12. The upper ends of the screw shafts are provided with bevel pinions 18 which mesh with bevel pinions 19 on the horizontal shaft 20, extending across the bridge 8 and mounted at its ends in bearings 21 and 22. One end of the shaft 20 is provided with a squared head to be engaged by a wrench, if desired, and the opposite end is provided with a pulley 24, driven by a belt 25 from the pulley 26 on the end of the shaft of motor 27 mounted on the upper surface of the bearing 21. The motor 27 is a reversible motor and is controlled by the switch 30 at the side of the machine. There are also provided upper and lower limit switches 32, which are located in the path of the trip 33 on the arm 12, so that carriage is definitely stopped at the upper and lower limits of its movement.

The carriage is provided with an open gapped runway 35 in which is located the rotary shuttle 36, which is of the open gap type and is provided with the usual paper roll 38, tension device 39, edge folder 40 and edge gumming nozzle 41, all of which are well known in this art, detailed description being unnecessary. The shuttle is of the hollow type to provide the glue reservoir for the gum applying nozzle and is filled through the spout 42. The folded and glued paper passes from the attachment 41 to the tire T, which is held in upright position while the tire and the shuttle are rotated.

The motor 56 also drives the drums which support and rotate the tire. One of the tire supporting drums 80 is fixed to a shaft 81 mounted in stationary bearings 82 on the base plate 1. The other supporting drum 85 is movable toward and from the drum 80, being mounted for the purpose on a shaft 86 supported in boxes 88 slotted so as to slide on the base of the machine. Guiding pins 89, the upper ends of which are connected by plates 90 are received in the slots in the boxes. The boxes are connected by links 92 to arm 93 depending from the horizontal shaft 95. This shaft is mounted in bearings 96 on the base of the machine and is extended on the side of the machine adjacent bracket 11. The extended end of the shaft 95 is connected by the arm 97 and adjustable link 98 to a lever 99 pivoted in the base of the machine, the upper end of this lever extending behind the shuttle carriage. On the rear of the carriage arm 11 is an angular arm 100, which is rotatively adjustable on the carriage. The end of the arm carries a guide 101, embracing and movable over the lever 99. By adjusting the position of the arm 100, the drum 85 may be set at any point to secure the initial adjustment. This adjustment also secures a variation in the degree of automatic differential adjustment depending upon the position of the arm 100. Thus, in the horizontal position shown in Figure 4, the minimum adjustment is obtained.

It will be observed that as the shuttle is raised and lowered to adjust it to different sizes of tires, the drum 85 is moved toward and from the drum 80 and thus toward and from the plane of the shuttle. As the cross-section of the tire usually varies with its diameter, it is advisable to adjust the tire supporting drums simultaneously with the vertical adjustment of the shuttle, so as to maintain the correct lead of the paper from the shuttle to the tire. Unless this or a similar adjustment of the tire supporting drum is secured, the correct lead for the paper from the shuttle cannot be obtained at all adjustments of the shuttle. By shifting the position of the tire supporting drum, the tire is automatically shifted into the correct position for obtaining the proper lead of the paper.

The shaft of the drum 80 is connected to a bevel pinion 105, which meshes with a pinion 106, on the end of a shaft 107, extending longitudinally of the base plate. Feathered on the shaft is a bevel pinion 108 which engages with a bevel pinion 109 on the shaft of the roller 85. This arrangement drives the two tire supporting drums, in synchronism at all adjustments of the machine. The drum 80 is driven by a sprocket chain connection 110 from a counter shaft 111, which is driven by worm gearing on the shaft 52 (not shown).

In order to support and steady the tire, each of the drums 80 and 85 has associated therewith a pivoted plate 115 which supports two vertically flaring guiding rollers 116, which keep the tire centrally of the machine. To guide and steady the upper portion of the tire, there is provided the large flanged roller 118 which is carried on the ends of the arms 120, which are pivoted to the brackets 121 attached to the shuttle carriage 10. In order to assist in getting the heavy tires into the machine, an inclined platform or runway 123 is located at the front of the machine in alignment with the trough 2, so that the tires may be rolled into place without lifting.

When the machine is stopped and started by the operation of the control shaft 64, which operates the clutch for driving the shuttle from the shaft 52, it is also advisable to control the rotation of the shuttle and the rotation of the drums so that all of the parts may be operated in unison. In stopping the machine, the shuttle drive is disconnected and mechanism is provided for at the same time applying a brake to the shuttle driving mechanism, to the shuttle direct and disconnecting the tire supporting and driving drums. These elements will now be described.

The drive pulley 51 for the rotation of the shuttle is flanged as shown in Figure 3 and about the lower surface of the pulley is arranged the pivoted brake shoe 125, which is moved against the pulley by a pivoted lever 126, this lever being provided with an extension 127 which is received between and actuated by the collars 128, on the control shaft 64.

The shuttle 36 is provided with a flange 130 on its rear face and located in the shuttle carriage 10 is a brake shoe 131, pivoted at its upper end as shown at 132, and with its lower end attached to an operating lever 134. This lever is actuated by the rock shaft 135, mounted in the carriage and provided at its rear end with a bevel pinion 136, meshing with a bevel pinion 137 rotating in a bracket 138. The pinion 137 is feathered on a vertical shaft 140, so that it may be driven thereby at any vertical position of the shuttle carriage. The lower end of the shaft 140 is mounted in the base of the machine and carries an operating arm 142, having rounded forks 143, extending between the collars 144 on the control shaft. When the control shaft is shifted to detach the clutch 60 and to apply the brake to the pulley 51, the brake 131 is also applied directly to the shuttle.

It is an advantage to be able to rotate the tire by hand when the machine is not operating so as to inspect portions of the wrapping, to apply labels or for other purposes and for this reason the driving mechanism for the drums 80 and 85, on which the tires rest, is provided with a clutch by which the drums are disconnected from the remaining elements of the machine. The sprocket chain 110 drives a sprocket 150, which is journalled on the shaft 81. Keyed on the shaft 81 is the sliding clutch 152, the pins 153 of which are adapted to enter holes 154 in the sprocket, thereby connecting the sprocket and the shaft 81. When the control shaft is shifted to disconnect the drive and stop the machine, the pins are withdrawn. The movement of the clutch is controlled by a pivoted bell crank lever 156, one end of which is engaged and operated by the collar 158 on the shaft 64. The other end of the lever is forked and engages the pins 160 on a collar 161, fitting into the outer surface of the clutch 152. A coil spring 163 confined by a collar on one end of the shaft 81 and bearing against the clutch 152, tends to move the clutch into engagement at all times, which movement is resisted by the collar 158.

It is believed that the operation of the improved tire wrapping machine will have been sufficiently clear from the description which has been given, and further detailed statements of its operation are unnecessary. It will be appreciated that certain principles of the invention as shown and claimed may be embodied in other specific forms of machines and that the invention is not necessarily held to exact conformity with the details of the machine as described.

What is claimed is:—

1. In a wrapping machine for wrapping annular articles, spaced supporting drums for holding the articles in an upright position, a shuttle at the top of the article, means to adjust the shuttle vertically, a movable support for one of said drums, and means associated with the shuttle and the movable drum to cause coordinate movement of the shuttle and the drum.

2. In a wrapping machine for wrapping annular articles, spaced supporting drums for holding the articles in an upright position, a shuttle at the top of the article, means to adjust the shuttle vertically, a movable support for one of said drums, and means associated with the shuttle and the movable drum to cause coordinate movement of the shuttle and the drum, said means having provision for independent adjustment of the movable drum.

3. A wrapping machine comprising a base, two supporting drums on the base, the axis of one of said drums being fixed, a sliding mounting for the other drum, a shuttle, means for moving the shuttle vertically, and connecting mechanism associated with the shuttle and the sliding mounting to cause coordinate movement thereof.

4. A wrapping machine comprising a base, two supporting drums on the base, the axis of one of said drums being fixed, a sliding mounting for the other drum, vertical guideways, a shuttle and a shuttle carrier on the guideways, and connecting mechanism associated with the shuttle and the sliding mounting.

5. A wrapping machine comprising a base, two supporting drums on the base, the axis of one of said drums being fixed, a sliding mounting for the other drum, vertical guideways, a shuttle and a shuttle carrier on the guideways, and connecting mechanism associated with the shuttle and the sliding mounting, a motor and feeding means operated by the motor to raise and lower the shuttle carrier.

6. A wrapping machine comprising a base, two supporting drums on the base, one of said drums being movable relative to the other, a vertically movable shuttle, a motor, feeding means operated by the motor to raise and lower the shuttle, and connecting means associated with the shuttle and a drum to cause coordinate movement thereof.

7. In a wrapping machine, a motor, a shuttle, a belt for rotating the shuttle, a pulley for driving the belt, article supporting drums, driving connections from the motor to the pulley and the article supporting drums, driving connections from the motor pulley, a clutch in the driving connections, and a second clutch for driving the drums, and a single control shaft adapted to operate the several clutches and brakes simultaneously.

8. In a wrapping machine, means for supporting the article to be wrapped, a shuttle, a shuttle carriage movable toward and from the supporting means to accommodate varying sizes of articles to be wrapped, a brake for the shuttle located on the shuttle carriage, and connections for operating the brake at all positions of adjustment of the carriage.

9. In a wrapping machine, means for supporting the article to be wrapped, a shuttle, a shuttle carriage movable toward and from the supporting means to accommodate varying sizes of articles to be wrapped, a shuttle drive, a clutch in the shuttle drive, a brake for the shuttle, and connection between the clutch and the brake to operate them in unison at any adjustment of the shuttle carriage.

10. In an article wrapping machine, a base, article supporting and rotating means on the base, guideways on the base, a shuttle and shuttle carriage movable over the guideways, a belt passing around the shuttle, a plurality of pulleys fixed on the machine and a pulley on the shuttle carriage, the belt passing around the said pulleys.

11. In an article wrapping machine, a base, article supporting and rotating means on the base, a shuttle carriage adjustable toward and from the base, a shuttle on the carriage, a drive pulley on the base, a pulley on the carriage and a belt passing over the drive pulley, around the shuttle and over the pulley on the carriage.

12. In an article wrapping machine, a base, article supporting and rotating means on the base, a shuttle carriage adjustable relatively to the article supporting means, a shuttle on the carriage, a belt passing around the shuttle, and means to automatically maintain an invariable length of path for the belt, including a pulley for the belt located in the carriage.

13. In a wrapping machine, means for supporting and moving the article to be wrapped, a shuttle, a shuttle carriage movable toward and from the article to be wrapped, a belt of invariable length passing around a power pulley, the shuttle and an idler pulley attached and movable with the shuttle carriage.

HERMAN SCHOIJ.